United States Patent [19]

Allan

[11] 4,299,690

[45] Nov. 10, 1981

[54] DEMULSIFYING PETROLEUM EMULSIONS WITH ARYL SULFONATES-OXYALKYLATED PHENOLFORMALDEHYDE RESINS AND ALKALI METAL HALIDES

[75] Inventor: Brian W. Allan, Calgary, Canada

[73] Assignee: Texaco Canada Inc., Calgary, Canada

[21] Appl. No.: 879,429

[22] Filed: Feb. 21, 1978

[51] Int. Cl.³ .............................................. C10G 33/04
[52] U.S. Cl. ..................................... 208/188; 252/358
[58] Field of Search ..................... 208/188; 210/83, 84, 210/44; 252/332, 358

[56] References Cited

U.S. PATENT DOCUMENTS

| | | | |
|---|---|---|---|
| 2,914,484 | 11/1959 | Monson et al. | 252/332 |
| 2,965,658 | 12/1960 | Kirkpatrick | 208/188 |
| 3,438,892 | 4/1969 | Wymore et al. | 208/188 |
| 4,029,570 | 6/1977 | Coffman et al. | 208/188 |

FOREIGN PATENT DOCUMENTS

| | | | |
|---|---|---|---|
| 352929 | 10/1972 | U.S.S.R. | 208/188 |
| 406868 | 4/1974 | U.S.S.R. | 208/188 |
| 410074 | 4/1974 | U.S.S.R. | 208/188 |
| 478054 | 8/1975 | U.S.S.R. | 208/188 |

Primary Examiner—Curtis R. Davis
Attorney, Agent, or Firm—Carl G. Ries; Robert A. Kulason; Henry W. Archer

[57] ABSTRACT

A process for recovering oil from oil-in-water petroleum emulsions stabilized with clay and/or other solids by subjecting them to the action of an optimum amount of non-ionic, water-soluble, aryl sulfonates-oxyalkylated phenol formaldehyde resins at a pH of 7.0 to 8.0 and then adding a saturated aqueous alkali metal halide solution to the resulting mixture. The process is carried out at between about 200° F. and 240° F. and the mixture is allowed to stand in the quiescent state for a period of about 1 to about 10 hours to allow the halide solution to increase the specific gravity of the resulting aqueous phase by at least 0.02 thereby causing the bitumen to float and facilitating recovery of the oil.

7 Claims, 1 Drawing Figure

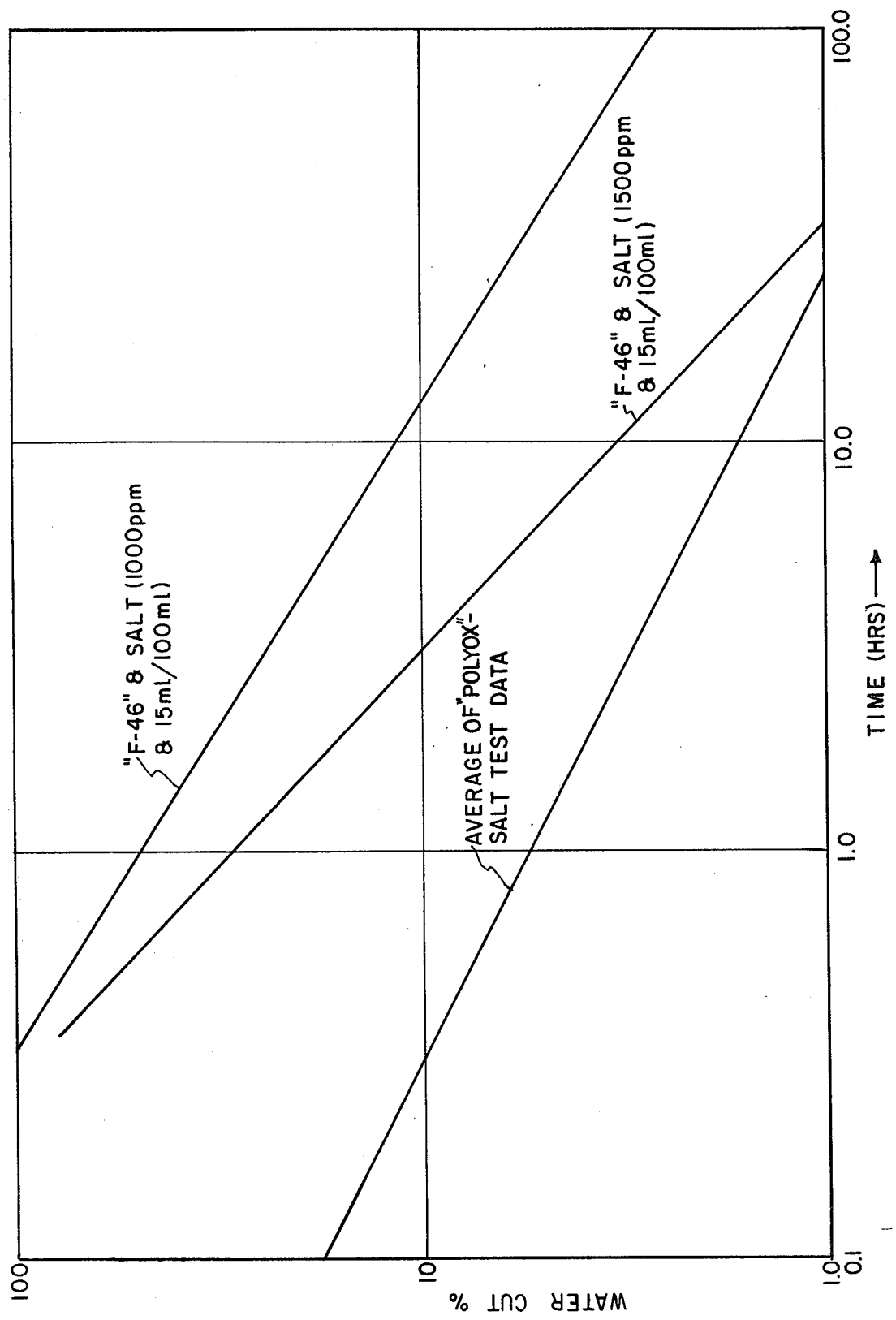

DEMULSIFYING PETROLEUM EMULSIONS WITH ARYL SULFONATES-OXYALKYLATED PHENOLFORMALDEHYDE RESINS AND ALKALI METAL HALIDES

BACKGROUND OF THE INVENTION

1. Field of the Invention

This invention is concerned with the resolution of water-bituminous emulsions stabilized with clay by treatment with aryl sulfonate-oxyalkylated phenolformaldehyde resins and a saturated alkali metal halide solution. The invention is also concerned with the separation of water from bitumen which has been brought to the surface in the form of oil-in-water emulsions by an in-situ recovery process.

2. Statement of the Prior Art

Numerous hot water extraction methods exist for separating crude oil from bituminous sands (tar sands, oil sands and the like) which involve mixing such sands with hot or cold water and separating the sand from the resulting emulsions.

The technical difficulty encountered with emulsions produced by in-situ operations is that the liquid mixture is a highly stabilized emulsion which is difficult to break with standard treating chemicals.

The attempts in the prior art to break emulsions resulting from hot water extraction processes are represented, inter alia, by the techniques described in U.S. Pat. Nos. 3,808,120, 3,607,721, and 3,487,003.

U.S. Pat. No. 3,808,120 describes a method for separating at least water and solids from the froth produced in a hot water process of separating bitumen from tar sands by treating the froth in at least one cyclone zone, after which it is treated in at least two centrifuging zones.

In U.S. Pat. No. 3,606,721 a process for the removal of solids and emulsified water from the bituminous emulsion is disposed which comprises diluting the emulsion with a hydrocarbon diluent; maintaining the resulting mixture in a settling zone; removing the emulsion when substantially free of solids and emulsified water from the top of the settling zone; withdrawing settled sludge from the bottom of the settling zone and centrifuging the withdrawn sludge to separate bitumen and diluent from the settled solids and the emulsified water.

U.S. Pat. No. 3,487,003 describes a method for reducing the solids content of an effluent discharge from a hot water process for separating oil from bituminous sands by adding a flocculating agent which may be organic, inorganic or even a polyalkylene oxide of undisclosed molecular weight to this effluent; adjusting the pH of the effluent to less than 7.5 or more than 9 to effect flocculation of at least a portion of the solids therein; centrifuging the effluent now containing flocculated solids and recovering the effluent discharge substantially reduced in solids content. This method treats not an oil-in-water emulsion but rather an effluent comprised of the effluent from the sand tailing layer and the middlings layer. Further, there is no appreciation therein of the necessity for maintaining the temperature within a given range during treatment with the flocculating agent.

U.S. Pat. No. 2,964,478 describes a process for breaking an oil-in-water emulsion by subjecting the emulsion to the sole action of a polyalkylene oxide having a molecular weight of 100,000 to 3 million. In the practice of that process the mixture of the resin is allowed to stand quiescent for about 19 hours at a settling temperature ranging from room temperature to 160° F., after which some of the oil rises to the surface of the pond or sump and is removed.

In coassigned U.S. Pat. No. 4,058,453, there is disclosed a process for recovering oil from oil-in-water and water-in-oil emulsions by demulsifying the emulsions by adding thereto effective amounts of non-ionic, water-soluble, polyethylene oxide polymers having a molecular weight in the range of 100,000 to 7,000,000, called "Polyox" and calcium chloride and separating the oil from the water. Preferably, in that process, the emulsions are diluted, following addition to the polymer, with from 30 to 50 volume percent of a hydrocarbon diluent and, after maintaining the temperature of the resulting mixture at between 150° and 210° F., the oil therein is centrifuged from the solids and the water. Unexpectedly, the process of this invention gives faster separation at a lower cost since a diluent is not needed, as in that patent.

Also generally known is the use of salt as a diluent in the separation of bitumen and water. Previously, rig tanks were filled with production fluid and salt added to the fluid. The result was relatively clean water but the bitumen could not be reduced below a water cut of about 20 percent. None of the above techniques discloses or suggests the present invention.

SUMMARY OF THE INVENTION

The main object of this invention is to achieve functional demulsification of emulsions at a minimal cost and in a minimum amount of time.

This object is attained by the present invention which resides in the concept of demulsifying emulsions stabilized by clays, surfactants, both naturally occurring and those formed in situ and/or asphaltenes, by adding from 500 to 2000 parts per million of water-soluble aryl sulfonate-oxyalkylated phenol formaldehyde resins and about 15 parts per 100 parts by volume of the emulsion, of a saturated alkali metal halide solution. The resins apparently deposit the stabilizing solids in the bitumen thus requiring a higher specific gravity water to float the solids. The brine provides the required increased specific gravity. The ionic effect of the salt in solution is also thought to assist the demulsification process.

Other aspects of this invention will be apparent to those skilled in the art from a reading of this disclosure and of the appended claims, in particular when taken with the accompanying drawing wherein the single figure is a graph, the curve of which shows the effect of resin concentration and of time on the concentrations tested; and comparing the water cut percent obtainable with the present system with that of U.S. Pat. No. 4,058,453.

DETAILED DESCRIPTION OF THE INVENTION

The process of the invention can be used to treat oil-bearing fluids derived by various methods from bituminous sands and conventional crude petroleum emulsion. In one such method, steam is injected in the sands formation through a center well in a multi-well pattern and the fluids are produced in the adjoining wells. The produced fluids are stable dilute oil-in-water emulsions containing an average of 15 percent oil with variations in oil phase concentrations from 0 to 40 percent.

The produced fluids can be treated in a conventional horizontal treater operated at between about 200 and 240° F. and about 30 psig pressure to separate the oil from the water phase. In the present process, to the resulting oil-in-water emulsion at a pH in the range of about 7 to about 8 is added from about 500 to about 1000 parts per million of an aryl sulfonate oxyalkylated ethylene formaldehyde resin. This resin is sold under the name of "F-46" by the Tretolite Division of Petrolite Corporation, 369 Marshall Avenue, St. Louis, Mo., 63119. As commercially sold, the material contains also unspecified aromatic hydrocarbons, isopropanol and methanol. After adding the above resin to the emulsion, a saturated solution of an alkali metal halide such as KCl or NaCl is added in an amount ranging from 10 to 20% by volume of the emulsion and preferably 15 percent. For obvious reasons of cost, a NaCl brine solution is preferred.

In the practice of the process of the invention, it has been discovered that if the resin is added to the emulsion first the rate of separation of the oil phase is faster than if the brine is added first or, for that matter, where they are added simultaneously. It is postulated that the reason for this behavior is that when the polymeric material is first added there is less chance solids and water will be entrained in the oil phase.

Mixing is carried out in steel treating vessels with the reagents added by means of a proportioning pump. After the oil rises to the surface of the fluid, it is removed by means of an overflow weir. The separated water containing very little of the previously emulsified oil can be discarded, or reconstituted with brine and recycled.

In examples of the practise of the invention, "F-46" and a brine solution were added in various amounts to 750 mls. of production fluid consisting of natural crude petroleum oil-in-water emulsions.

The samples used in testing were a mixture of all the production fluid on site. At no time during the testing was diluent incorporated. All the tests were run at 150° to 170° F. The data obtained were used to draw the accompanying graph.

The graph shows, for the present system, that separation using 1500 ppm of F-46 is about equivalent to the average obtained with "Polyox" and salt brine. However, because the F-46 resin decomposes or precipitates at a much higher temperature than Polyox, the present process can be carried out above 200° F. This is advantageous because the production fluid, which at this stage of processing is at above 195° F., does not have to be cooled down, as is the case when "Polyox" resins are used.

In the present treating system, the additive must act before the diluent will even mix with the bitumen to give the driving force for separation. The "F-46" virtually knocks the solids out of the bitumen and coalesces it, while, at the same time, the salt brine provides the driving force for separation. Both components are believed to work in parallel, and not in series. The salt brine also helps disperse the "F-46".

It is intended that various changes may be made in this invention in the practical development thereof, if desired. Such changes are comprehended within the meaning and range of equivalency of the following claims. The invention, therefor, is not to be restricted except as is necessitated by the prior art.

What is claimed is:

1. In a process for recovering oil from oil-in-water emulsions stabilized by clay and other solids comprising the steps of: subjecting said emulsions to the action of an effective amount of non-ionic, water-soluble, aryl sulfonates-oxyalkylated phenolformadehyde resins; the improvement consisting of adding brine to the resulting mixture in an amount sufficient to increase the specific gravity of the resulting aqueous phase by at least 0.02 whereby said oil rises above said phase; and, allowing the resulting system to remain in the quiescent state for about 1 to about 10 hours.

2. The process of claim 1, further including the step of removing said oil from said system.

3. The process of claim 1, wherein the emulsions, the polymers and said brine are maintained in contact at a temperature in the range of about 200° to about 240° F.

4. The process of claim 1, wherein said emulsions are production fluids produced by an in-situ recovery operation.

5. The process of claim 1, wherein from 500 to 2000 parts per million of resin are added on the basis of the volume of emulsion.

6. The process of claim 1, wherein the ratio of the volume of brine to the volume of the emulsion ranges from 10 to 20 percent.

7. The process according to claim 1, carried out at a pH of about 7.0 to about 8.0.

* * * * *